US008472940B2

(12) United States Patent
Defoug et al.

(10) Patent No.: US 8,472,940 B2
(45) Date of Patent: Jun. 25, 2013

(54) METHOD FOR SYNCHRONIZING A TUNER, CORRESPONDING DEVICE, RECEIVER COMPRISING THE DEVICE, AND MOBILE PHONE COMPRISING THE RECEIVER

(75) Inventors: Guillaume Defoug, Paris (FR); Joseph Antunes, Massy (FR)

(73) Assignee: Parrot, Paris (FR)

( * ) Notice: Subject to any disclaimer, the term of this patent is extended or adjusted under 35 U.S.C. 154(b) by 283 days.

(21) Appl. No.: 12/809,676

(22) PCT Filed: Dec. 16, 2008

(86) PCT No.: PCT/EP2008/067585
§ 371 (c)(1),
(2), (4) Date: Sep. 27, 2010

(87) PCT Pub. No.: WO2009/080602
PCT Pub. Date: Jul. 2, 2009

(65) Prior Publication Data

US 2011/0007214 A1 Jan. 13, 2011

(30) Foreign Application Priority Data

Dec. 21, 2007 (EP) .................................... 07291607

(51) Int. Cl.
*H04W 4/00* (2009.01)

(52) U.S. Cl.
USPC .................................... 455/422.1; 455/435.2

(58) Field of Classification Search
USPC .......... 455/422.1, 426.1, 432.1, 435.1–435.3, 455/436–444, 448; 370/331, 328, 338
See application file for complete search history.

(56) References Cited

U.S. PATENT DOCUMENTS 8,055,261 B2 * 11/2011 Kim .............................. 455/434
2008/0242224 A1 * 10/2008 Fratti et al. ................... 455/3.06

FOREIGN PATENT DOCUMENTS

JP 2006115319 A 4/2006
WO 2007024824 A 3/2007

OTHER PUBLICATIONS

Adrian John Hornsby et al: "Network and Service Discovery in Heterogeneous Broadcast Environment", Mobile and Wireless Communications Summit, Jul. 1, 2007, pp. 1-5, XP031132354.
International Search Report in Corresponding Application No. PCT/EP2008/067585 dated Feb. 17, 2009.

* cited by examiner

*Primary Examiner* — Brandon Miller
(74) *Attorney, Agent, or Firm* — Young & Thompson

(57) ABSTRACT

The method includes determining (100) a first surface of a first coverage zone, determining (102) second surfaces of second coverage zones, determining (104), amongst the second coverage zones, a second coverage zone, referred to as the most probable second coverage zone, whose second surface has the greater overlapping with the surface of the first coverage zone, and attempting (106) to synchronize the turner with a second signal emitted over the most probable second coverage zone, in order to receive a second service.

17 Claims, 2 Drawing Sheets

METHOD FOR SYNCHRONIZING A TUNER, CORRESPONDING DEVICE, RECEIVER COMPRISING THE DEVICE, AND MOBILE PHONE COMPRISING THE RECEIVER

BACKGROUND OF THE INVENTION

1. Field of the Invention

The present invention relates to a method for synchronizing a tuner during a change of coverage zone.

2. Description of the Related Art

Known mobile phones may comprise a DVB-H receiver, which comprises a tuner and a demodulator.

Several DVB-H networks are often available for a user of the mobile phone. The user may want to switch from a service of a first DVB-H network to a service of a second DVB-H network. The tuner of the DVB-H receiver therefore needs to be synchronized with a DVB-H signal of the second network.

More precisely, when the mobile phone, and thus the tuner, is located in the first coverage zone, the tuner is synchronized with the first signal emitted over the first coverage zone.

The second network, intended to be accessed, comprises second coverage zones, covering an broad area. A respective second signal is emitted over each second coverage zone, at a respective frequency. The problem is thus to find an available second signal of the second network.

A known method for synchronizing the tuner to one of the second signals comprises obtaining all the frequency values of the frequencies of the second signals of the second network, and then scanning all the obtained frequency values, in order to determine available frequencies of the second coverage zone. The tuner is afterwards synchronized with a second signal emitted at one of the available frequencies, generally the second signal having the most power.

BRIEF SUMMARY OF THE INVENTION

However, scanning all the obtained frequency values is a process that takes time, typically around ten seconds. The user of the mobile phone must therefore wait all that time before accessing to the second service of the second network and this consumes power and uses battery, and the scanning of all the obtained frequencies of all the available networks can take so much time that it consumes a lot of power.

The invention aims at alleviating the previous problem by proposing a method for synchronizing a tuner that does not always need to scan all the frequency values of the frequencies of the second network.

Accordingly, the invention relates to a method for synchronizing a tuner according to claim 1.

Other features of the method are set forth in claims 2 to 5.

The invention further relates do a device for synchronizing a tuner according to claim 6.

Other features of the device are set forth in claims 7 to 10.

The invention further relates to a DVB-H receiver according to claim 11, and a mobile phone according to claim 12.

BRIEF DESCRIPTION OF THE DRAWINGS

These features and other of the invention will become apparent by reading the following description of an embodiment of the invention. The description refers to the enclosed drawings, which comprise:

a FIG. 1 representing a mobile phone comprising a DVB-H receiver according to the invention, and a FIG. 2 being a blocs diagram of a method for synchronizing a tuner, achieved by the DVB-H receiver of FIG. 1.

DETAILED DESCRIPTION OF THE PREFERRED EMBODIMENTS

In the following description, a network means either a particular network conveying a single content, i.e. the same services over the whole coverage area of the network, or a layer of a network that comprises several superposed layers, each layer conveying the same content, i.e. the same services over the whole coverage area of the layer.

Figure 1:
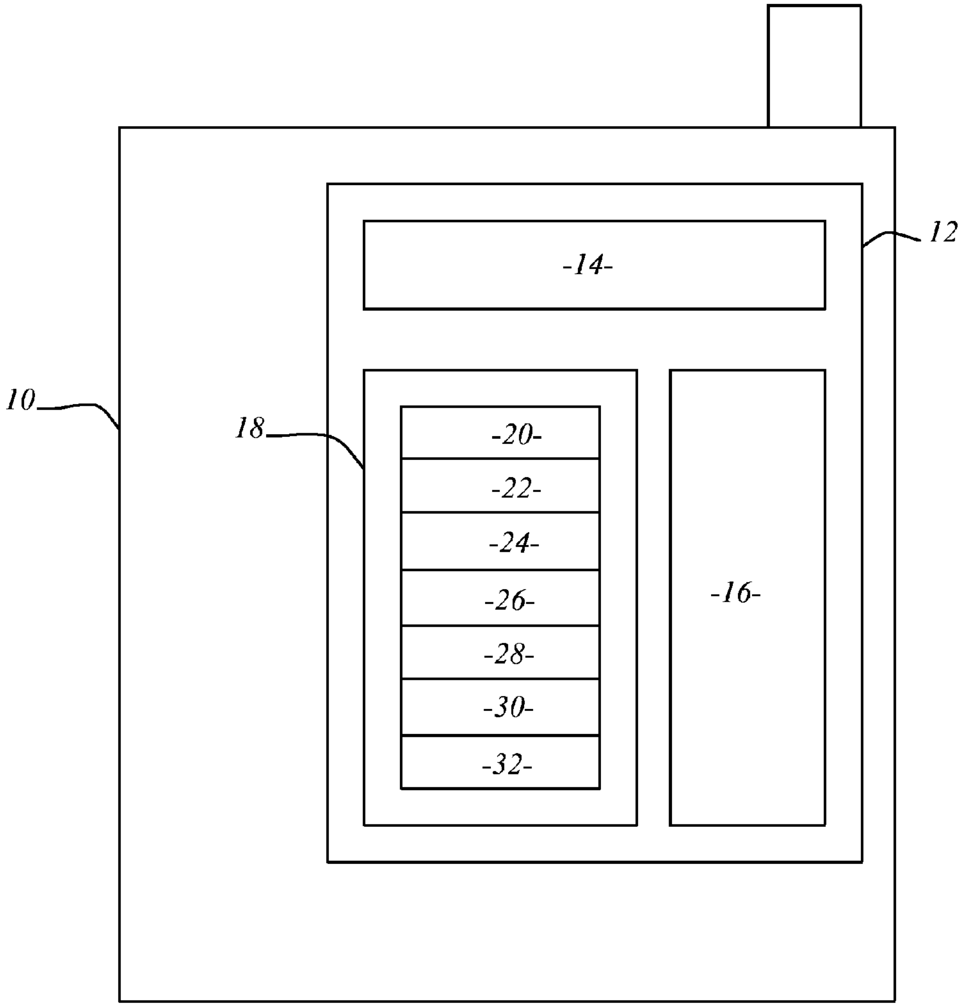

Referring to FIG. 1, a mobile phone 10 comprises a DVB-H receiver 12.

The DVB-H receiver 12 comprises a tuner 14, a demodulator 16 and a device 18 for synchronizing the tuner 14.

The tuner 14 is configured for synchronizing to a DVB-H signal emitted at a respective frequency, and for scanning frequency values, in order to determine available frequencies.

The demodulator 16 is configured for demodulating the signal to which the tuner is synchronized, in order to allow the terminal 10 to display a service to the user.

The synchronizing device 18 comprises a processing device 20 for determining a first surface of a first coverage zone, in which the tuner is located, and over which a first DVB-H signal is emitted, when the tuner 14 is synchronized with the first DVB-H signal.

The synchronizing device 18 further comprises a processing device 22 for determining second surfaces of second coverage zones, over each a respective second DVB-H signal is emitted, at a respective second frequency.

More precisely, the processing device 20 and the processing device 22 are configured for using service information conveyed in the first DVB-H signal. Preferably, the service information comprise SI/PSI tables.

The synchronizing device 18 further comprises a processing device 24 for determining, amongst the second coverage zones, a second coverage zone, referred to as the most probable second coverage zone, whose second surface has the greater overlapping with the surface of the first coverage zone.

The synchronizing device 18 further comprises a processing device 26 for attempting to synchronize the tuner 12 with the most probable second coverage zone.

The synchronizing device 18 further comprises a processing device 28 for obtaining, in case attempting to synchronize with the second signal of the most probable second coverage zone is unsuccessful, the frequency values of the frequencies of all the second coverage zones of the second network.

More precisely, the frequency values of all the frequencies of the second coverage zones are obtained from service information conveyed in the first DVB-H signal. Preferably, the service information comprise SI/PSI tables.

The synchronizing device 18 further comprises a processing device 30 for controlling the tuner 12 for scanning the obtained frequency values, in order to determine available frequencies of the second coverage zones.

The synchronizing device 18 further comprises a processing device 32 for synchronizing the tuner 14 with a second signal emitted at one of the available frequencies.

Figure 2:
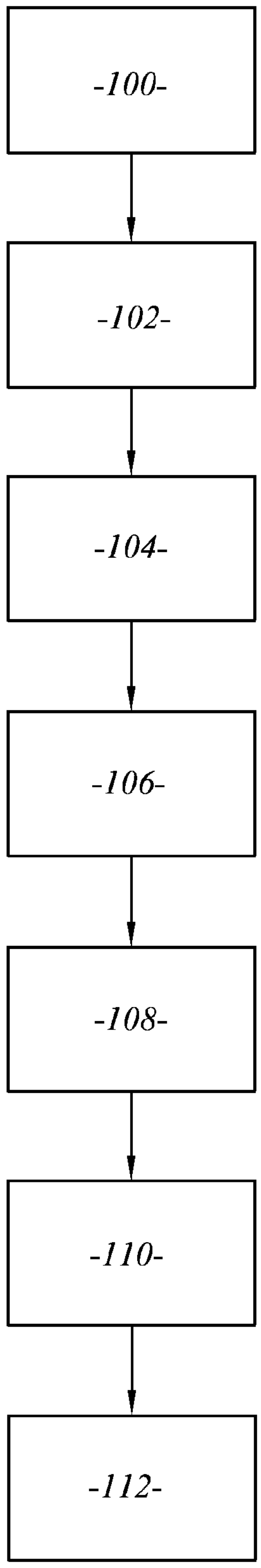

Referring to FIG. 2, a method, achieved by the synchronizing device 18, for synchronizing the tuner 14 will now be explained.

The mobile phone 10 is located in a first DVB-H network, as well as in a second DVB-H network, distinct from the first DVB-H network.

The first DVB-H network comprises a plurality of first coverage zones. Over each first coverage zone, a respective first DVB-H signal is emitted, at a respective frequency. The mobile phone 10, and thus the tuner 14, is located in one of the first coverage zones, referred to as the current coverage zone. The current coverage zone has a first surface. A first DVB-H signal, referred to as the current DVB-H signal, is emitted over the current coverage zone.

The tuner 14 is synchronized with the current DVB-H signal, in order to receive at least one service conveyed by the current DVB-H signal. The demodulator 14 demodulates the time slices (also called bursts) dedicated to the at least one service being received.

The second DVB-H network comprises a plurality of second coverage zones. Over each second coverage zone, a respective second DVB-H signal is emitted, at a respective frequency. Each second coverage zone has a second surface.

The method first comprises the processing device 20 determining (step 100) the first surface of the first coverage zone, by using the SI/PSI tables conveyed in the current DVB-H signal. More precisely, the SI/PSI tables store surface information of all the first coverage zones of the first DVB-H network, in the form of the coordinates of two points, defining a rectangular coverage zone.

The method further comprises the processing device 22 determining (step 102) the second surfaces of all the second coverage zones of the second DVB-H network. Similarly, the SI/PSI tables conveyed in the current DVB-H signal are used. More precisely, it is common that different networks exchange service information. Therefore, the SI/PSI tables conveyed in the current DVB-H signal of the first network also store surface information of all the second coverage zones of the second DVB-H network, in the form of the coordinates of two points, defining a rectangular coverage zone.

The method further comprises the processing device 24 determining (step 104), amongst the second coverage zones, a second coverage zone, whose second surface has the greater overlapping with the surface of the first coverage zone. This is realized by comparing the size and the position of rectangular zones.

The determined second coverage zone is referred to as the most probable second coverage zone, because it is the second coverage zone in which the mobile phone 10 has the most chance to be located (because of the overlapping). It is therefore worth to try to synchronize the tuner 14 to the second signal emitted in this most probable zone, before scanning the frequency values of the frequencies of all the second coverage zones.

Consequently, the method further comprises the processing device 26 attempting (step 106) to synchronize the tuner 14 with second signal of the most probable second coverage zone, in order to receive at least one second service, the at least one second service being different from the at least one first service.

However, it is not sure that the mobile phone 10 is actually located in the most probable zone.

Consequently, the method further comprises, in case attempting to synchronize with the most probable second coverage zone is unsuccessful, the processing device 28 obtaining (step 108) the frequency values of the frequencies of all the second coverage zones, the processing device 30 controlling (step 110) the tuner 14 for scanning the obtained frequency values, in order to determine available frequencies of the second coverage zones, and the processing device 32 synchronizing (step 112) the tuner 14 with a second signal emitted at one of the available frequencies.

The invention claimed is:

1. A method for synchronizing a tuner (14), a first signal being emitted over a first coverage zone having a first surface, the tuner (14) being located in the first coverage zone, the tuner (14) being synchronized with the first signal, in order to receive a first service, the method comprising:

determining (100) the first surface of the first coverage zone, determining (102) second surfaces of second coverage zones, over each a respective second signal is emitted, determining (104), amongst the second coverage zones, overlapping with the first coverage zone, a second coverage zone, referred to as a most probable second coverage zone, whose second surface has a greatest overlapping with the surface of the first coverage zone, attempting (106) to synchronize the turner (14) with the second signal emitted over the most probable second coverage zone, in order to receive a second service.

2. The method according to claim 1, wherein determining (100) the first surface of the first coverage zone, and determining (102) the second surfaces of the second coverage zones is realized from service information conveyed in the first signal.

3. The method according to claim 2, wherein:

the first signal is a Digital Video Broadcasting-Handheld (DVB-H) signal, and the service information comprise Service Information/Program Specific Information (SI/PSI) tables.

4. A method according to claim 3, wherein the first coverage zone belongs to a first network, while the second coverage zones belongs to a second network, the second network being distinct from the first network.

5. The method according to claim 3, wherein each of the second signals is emitted at a respective frequency, in case attempting (106) to synchronize with the most probable second coverage zone is unsuccessful, the method further comprising:

obtaining (108) frequency values of the frequencies of the second coverage zones, controlling (110) the tuner (14) for scanning the obtained frequency values, in order to determine available frequencies of the second coverage zones, synchronizing (112) the tuner (14) with a second signal emitted at one of the available frequencies.

6. The method according to claim 2, wherein the first coverage zone belongs to a first network, and the second coverage zones belongs to a second network, which is distinct from the first network.

7. The method according to claim 2, wherein each of the second signals is emitted at a respective frequency, in case attempting (106) to synchronize with the most probable second coverage zone is unsuccessful, the method further comprising:

obtaining (108) frequency values of the frequencies of the second coverage zones, controlling (110) the tuner (14) for scanning the obtained frequency values, in order to determine available frequencies of the second coverage zones, synchronizing (112) the tuner (14) with a second signal emitted at one of the available frequencies.

8. The method according to claim 1, wherein the first coverage zone belongs to a first network, and the second coverage zones belongs to a second network, the second network being distinct from the first network.

9. The method according to claim 8, wherein each of the second signals is emitted at a respective frequency, in case attempting (106) to synchronize with the most probable second coverage zone is unsuccessful, the method further comprising:

obtaining (108) the frequency values of the frequencies of the second coverage zones, controlling (110) the tuner (14) for scanning the obtained frequency values, in order to determine available frequencies of the second coverage zones, synchronizing (112) the tuner (14) with a second signal emitted at one of the available frequencies.

10. The method according to claim 1, wherein each of the second signals is emitted at a respective frequency, in case attempting (106) to synchronize with the most probable second coverage zone is unsuccessful, the method further comprising:

obtaining (108) frequency values of the frequencies of the second coverage zones, controlling (110) the tuner (14) for scanning the obtained frequency values, in order to determine available frequencies of the second coverage zones, synchronizing (112) the tuner (14) with a second signal emitted at one of the available frequencies.

11. A device (18) for synchronizing a tuner (14), comprising:

a first processing device (20) configured to determine a first surface of a first coverage zone, in which the tuner (14) is located, and over which a first signal is emitted, the tuner (14) being synchronized with the first signal in order to receive a first service, a second processing device (22) configured to determine second surfaces of second coverage zones, over each a respective second signal is emitted, a third processing device (24) configured to determine, amongst the second coverage zones overlapping with the first coverage zone, a second coverage zone, referred to as a most probable second coverage zone, whose second surface has a greatest overlapping with the surface of the first coverage zone, a fourth processing device (26) configured to attempt to synchronize the tuner (14) with the second signal of the most probable second coverage zone, in order to receive a second service.

12. The device (18) according to claim 11, wherein the first processing device (20) configured to determine the first surface and the second processing device (22) configured to determine the second surfaces are configured for using service information conveyed in the first signal.

13. The device (18) according to claim 12, wherein the first signal is a Digital Video Broadcasting-Handheld (DVB-H) signal, and the service information comprise Service Information/Program Specific Information (SI/PSI) tables.

14. The device (18) according to claim 11, wherein the first coverage zone belongs to a first network, and the second coverage zones belongs to a second network that is distinct from the first network.

15. The device (18) according to claim 11, wherein each of the second signals is emitted at a respective frequency, the device further comprising:

a fifth processing device (28) configured to obtain, in case attempting to synchronize with the most probable second coverage zone is unsuccessful, frequency values of the frequencies of the second coverage zones, a sixth processing device (30) configured to control the tuner (14) for scanning the obtained frequency values, in order to determine available frequencies of the second coverage zones, a seventh processing device (32) configured to synchronize the tuner (14) with a second signal emitted at one of the available frequencies.

16. A Digital Video Broadcasting-Handheld (DVB-H) receiver (12) comprising a tuner (14), a demodulator (16) for demodulating a current signal, and the device according to claim 11.

17. A mobile phone (10) comprising the DVB-H receiver (12) according to claim 16.

* * * * *

UNITED STATES PATENT AND TRADEMARK OFFICE
CERTIFICATE OF CORRECTION

PATENT NO. : 8,472,940 B2
APPLICATION NO. : 12/809676
DATED : June 25, 2013
INVENTOR(S) : Defoug et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this
Eighth Day of September, 2015

Michelle K. Lee

Michelle K. Lee
*Director of the United States Patent and Trademark Office*